US006662260B1

United States Patent
Wertheim et al.

(10) Patent No.: US 6,662,260 B1
(45) Date of Patent: Dec. 9, 2003

(54) ELECTRONIC CIRCUITS WITH DYNAMIC BUS PARTITIONING

(75) Inventors: Elon Wertheim, Hod Hasharon (IL); Andreas Daniel Olofsson, Tel Aviv (IL)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 09/537,066

(22) Filed: Mar. 28, 2000

(51) Int. Cl.$^7$ ............................................. G06F 13/00
(52) U.S. Cl. ...................................................... 710/316
(58) Field of Search ................................. 710/305–317, 710/300

(56) References Cited

U.S. PATENT DOCUMENTS

| | | | |
|---|---|---|---|
| 4,821,174 A | | 4/1989 | Webb et al. |
| 4,922,409 A | | 5/1990 | Schoellkopf et al. |
| 5,862,359 A | * | 1/1999 | Nozuyama ................... 710/316 |
| 5,896,543 A | | 4/1999 | Garde ..................... 395/800.35 |
| 6,081,863 A | * | 6/2000 | Kelley et al. ............... 710/312 |
| 6,182,178 B1 | * | 1/2001 | Kelley et al. ............... 710/107 |
| 6,195,723 B1 | * | 2/2001 | Neal et al. .................. 710/113 |
| 6,237,057 B1 | * | 5/2001 | Neal et al. .................. 710/309 |
| 6,338,107 B1 | * | 1/2002 | Neal et al. .................. 710/302 |

FOREIGN PATENT DOCUMENTS

EP    0 892 352    1/1999

OTHER PUBLICATIONS

Kapadia et al., "Reducing Switching Activity on Datapath Buses With Control–Signal Gating", IEEE Journal of Solid–State Circuits, vol. 34, No. 3, (Mar. 1999), pp. 405–414.

* cited by examiner

Primary Examiner—Paul R. Myers
(74) Attorney, Agent, or Firm—Wolf, Greenfield & Sacks, P.C.

(57) ABSTRACT

Electronic circuits utilize dynamic bus partitioning to reduce power consumption. An electronic circuit includes several functional electronic blocks, a bus interconnecting the functional blocks, one or more electronically controllable switches partitioning the bus into bus segments and a switch controller. Each of the electronically controllable switches has an on state wherein two of the bus segments are interconnected and an off state wherein the two bus segments are isolated. The switch controller controls the states of the switches in response to control information representative of the source and the destination of each bus transaction. The switch controller may dynamically change the states of the switches between transactions of a sequence of bus transactions. In another embodiment, the switch controller may control the states of the switches to permit two or more bus transactions to be performed simultaneously.

25 Claims, 7 Drawing Sheets

US 6,662,260 B1

ELECTRONIC CIRCUITS WITH DYNAMIC BUS PARTITIONING

GOVERNMENT LICENSE RIGHTS

The U.S. Government may have a license in this invention and the right under limited circumstances to require the patent owner to license others on reasonable terms as provided for by the terms of contract no. N6601-96-C-8610 awarded by the Defense Logistics Agency to Analog Devices, Inc.

FIELD OF THE INVENTION

This invention relates to buses used for carrying information between functional blocks of an electronic circuit and, more particularly, to electronic circuits which utilize dynamic bus partitioning for reduced power consumption. The invention is typically utilized for improving the operation of high speed circuitry on a single monolithic substrate, but is not limited to such use.

BACKGROUND OF THE INVENTION

In state of the art processors, the use of on-chip memory and wide internal buses has become an increasingly common approach to solving the throughput bottleneck associated with moving data on and off a chip. This trend, combined with very long instruction word architectures and high operating frequencies, has caused the capacitance and power consumption of on-chip buses to increase dramatically.

As used herein, the term "bus" refers to a set of electrical conductors, typically multiple conductors, used for carrying electrical signals between two or more circuits. The bus may be a data bus, an address bus, a control bus or any other type of bus. The electrical signals may represent data, addresses, control information, instructions, operands or any other type of information. The bus is typically an internal bus on a monolithic integrated circuit, known as an "on-chip" bus.

A digital signal processor architecture that utilizes three 128-bit data buses is disclosed in U.S. Pat. No. 5,896,543 issued Apr. 20, 1999 to Garde. The data buses interconnect three memory banks, two computation blocks, a control block and an external port. The clock rate of the data buses may be 166 Megahertz or greater. It may be shown that three 128-bit data buses operating at a frequency of 250 Megahertz dissipate 1.5 watts when it is assumed that each bus conductor has a capacitance of 5 picofarads. The size and complexity of such a digital signal processor architecture dictate a large chip and therefore relatively long bus lengths and high capacitance. The higher capacitance contributes to increased power dissipation and reduces the maximum operating frequency. Furthermore, in devices having buses with a large number of bits, it is not always possible to simply make each conductor wider to increase the speed of the bus, as this would cause the bus to be unacceptably large. The bus would also consume far too much power, since the power of the bus grows linearly with the width of the bus conductors.

A technique for reducing power dissipation in large datapaths is disclosed by H. Kapadia et al. in "Reducing Switching Activity on Datapath Buses with Control-Signal Gating", IEEE Journal of Solid-State Circuits, Vol. 34, No. 3, March 1999, page 405–414. The disclosed technique involves control signal gating. When a bus is not used in a datapath, it is held in a quiescent state by stopping the propagation of switching activity through the module driving the bus. The disclosed technique involves the use of multiplexers in the datapath. This approach has the disadvantage that the multiplexers can add significantly to the delay of the datapath.

Accordingly, there is a need for improved techniques for reducing power dissipation and capacitance on high speed buses.

SUMMARY OF THE INVENTION

According to a first aspect of the invention, electronic apparatus is provided. The electronic apparatus comprises a plurality of functional electronic blocks, a bus interconnecting the functional blocks, one or more electronically controllable switches partitioning the bus into bus segments and a switch controller. Each of the electronically controllable switches has an on state wherein two of the bus segments are interconnected and an off state wherein the two bus segments are isolated. The switch controller controls the states of the electronically controllable switches in response to control information, such as information representative of the source and the destination of each bus transaction.

In a preferred embodiment, the functional blocks are components of a digital signal processor and may be fabricated on a single substrate.

The switch controller may include a source-destination decoder for controlling the states of the electronically controllable switches in response to control information representative of the source and the destination of each bus transaction. The switch controller may dynamically change the states of the electronically controllable switches between transactions of a sequence of bus transactions. In another embodiment, the switch controller may control the states of the electronically controllable switches to permit two or more bus transactions to be performed simultaneously.

According to another aspect of the invention, a method is provided for communicating between functional blocks in electronic apparatus comprising a plurality of functional electronic blocks interconnected by a bus. The method comprises the steps of partitioning the bus into bus segments, enabling a bus transaction between a source functional block and a destination functional block by interconnecting bus segments to complete a connection between the source and destination functional blocks, and performing the bus transaction on the interconnected bus segments.

According to a further aspect of the invention, electronic apparatus comprises a plurality of functional electronic blocks interconnected by a bus, means for partitioning the bus into bus segments, and means for enabling a bus transaction on the bus by interconnecting bus segments in response to control information representative of the source and the destination of the bus transaction.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
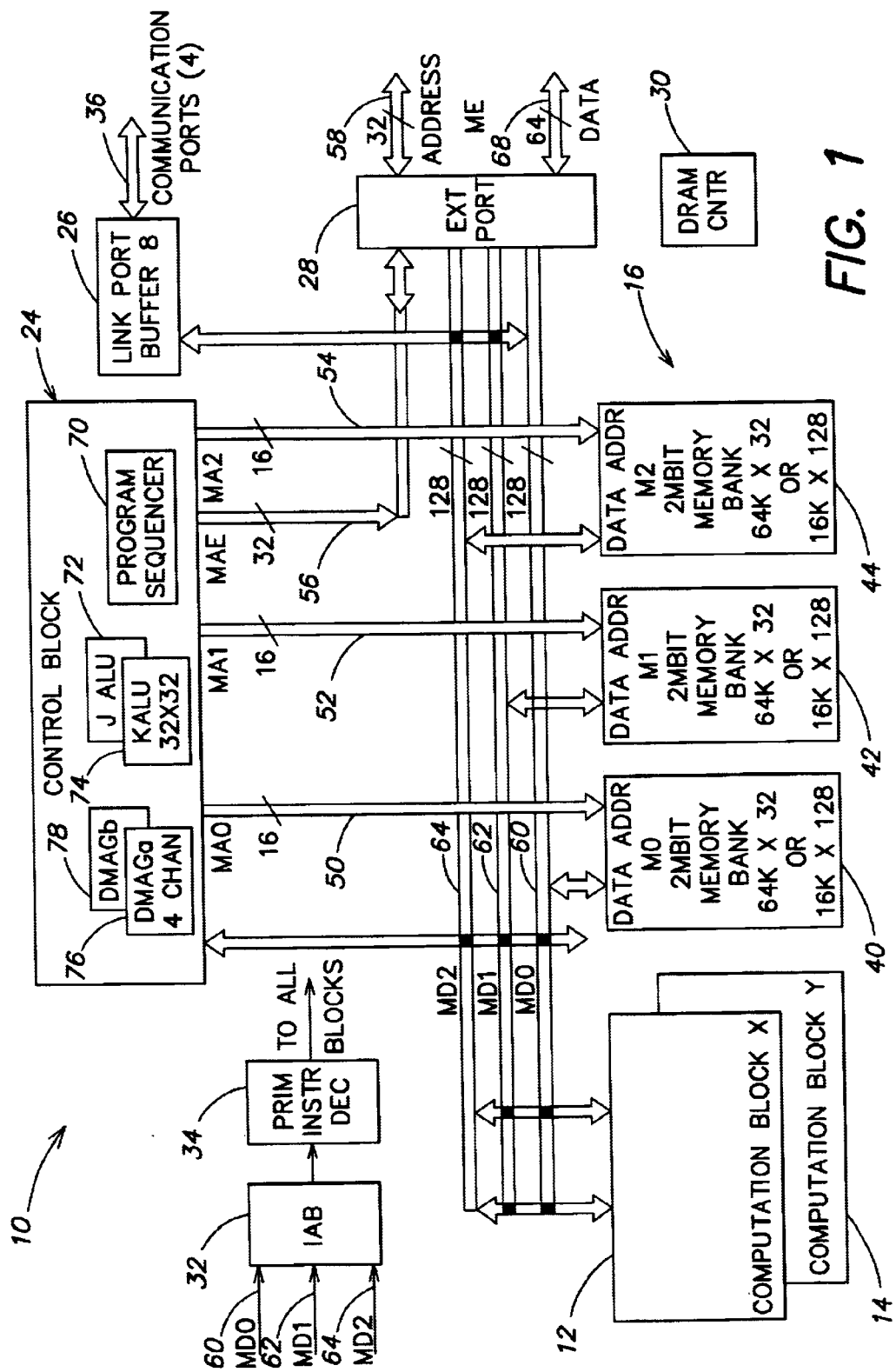
FIG. 1 is a block diagram of a digital signal processor architecture suitable for incorporation of the present invention.

A block diagram of a digital signal processor (DSP) 10 suitable for incorporation of the present invention is shown in FIG. 1. The principal components of DSP 10 are computation blocks 12 and 14, a memory 16, a control block 24, link port buffers 26, an external port 28, a DRAM controller 30, an instruction alignment buffer (IAB) 32 and a primary instruction decoder 34. The computation blocks 12 and 14, the instruction alignment buffer 32, the primary instruction decoder 34 and the control block 24 constitute a core processor which performs the main computation and data processing functions of the DSP 10. The external port 28 controls external communications via an external address bus 58 and an external data bus 68. The link port buffers 26 control external communication via communication ports 36. The DSP is preferably configured as a single monolithic integrated circuit.

The memory 16 includes three independent, large capacity memory banks 40, 42 and 44. In a preferred embodiment, each of the memory banks 40, 42 and 44 has a capacity of 64K words of 32 bits each. Each of the memory banks 40, 42 and 44 preferably has a 128-bit data bus. Up to four consecutive aligned data words of 32 bits each can be transferred to or from each memory bank in a single clock cycle.

The elements of the DSP 10 are interconnected by buses for efficient, high speed operation. Each of the buses includes multiple lines for parallel transfer of binary information. A first address bus 50 (MA0) interconnects memory bank 40 (M0) and control block 24. A second address bus 52 (MA1) interconnects memory bank 42 (M1) and control block 24. A third address bus 54 (MA2) interconnects memory bank 44 (M2) and control block 24. Each of the address buses 50, 52 and 54 is preferably 16-bits wide. An external address bus 56 (MAE) interconnects external port 28 and control block 24. The external address bus 56 is interconnected through external port 28 to external address bus 58. Each of the external address buses 56 and 58 is preferably 32 bits wide. A first data bus 60 (MD0) interconnects memory bank 40, computation blocks 12 and 14, control block 24, link port buffers 26, IAB 32 and external port 28. A second data bus 62 (MD1) interconnects memory bank 42, computation blocks 12 and 14, control block 24, link port buffers 26, IAB 32 and external port 28. A third data bus 64 (MD2) interconnects memory bank 44, computation blocks 12 and 14, control block 24, link port buffers 26, IAB 32 and external port 28. The data buses 60, 62 and 64 are connected through external port 28 to external data bus 68. Each of the data buses 60, 62 and 64 is preferably 128 bits wide, and external data bus 68 is preferably 64 bits wide.

The control block 24 includes a program sequencer 70, a first integer ALU 72 (J ALU), a second integer ALU 74 (K ALU), a first DMA address generator 76 (DMAG A) and a second DMA address generator 78 (DMAG B). The integer ALU's 72 and 74, at different times, execute integer ALU instructions and perform data address generation. During execution of a program, the program sequencer 70 supplies a sequence of instruction addresses on one of the address buses 50, 52, 54 and 56, depending on the memory location of the instruction sequence. Each of the integer ALU's 72 and 74 supplies a data address on one of the address buses 50, 52, 54 and 56, depending on the location of the operand required by the instruction. In response to the addresses generated by integer ALU's 72 and 74, the memory banks 42 and 44 supply operands on data buses 62 and 64, respectively, to either or both of the computation blocks 12 and 14. The memory banks 40, 42 and 44 are interchangeable with respect to storage of instructions and operands.

As indicated above, wide data buses operating at high speed, such as the three 128-bit data buses in the digital signal processor of FIG. 1, produce significant power dissipation. An electronic circuit wherein bus power dissipation is limited is shown in the schematic block diagram of FIG. 2. Functional electronic blocks 110, 112, 114, 116 and 118 are interconnected by a bus 120. Functional blocks 110, 112, 114 and 1 16may correspond, for example, to memory bank 40, computation block 12, control block 24 and external port 28, respectively, in FIG. 1, and bus 120 may correspond to 128-bit data bus 60. In general, functional blocks 110, 112, 114, 116 and 118 are electronic circuits, and bus 120 is a multiple conductor connection between the electronic circuits.

Figure 2:
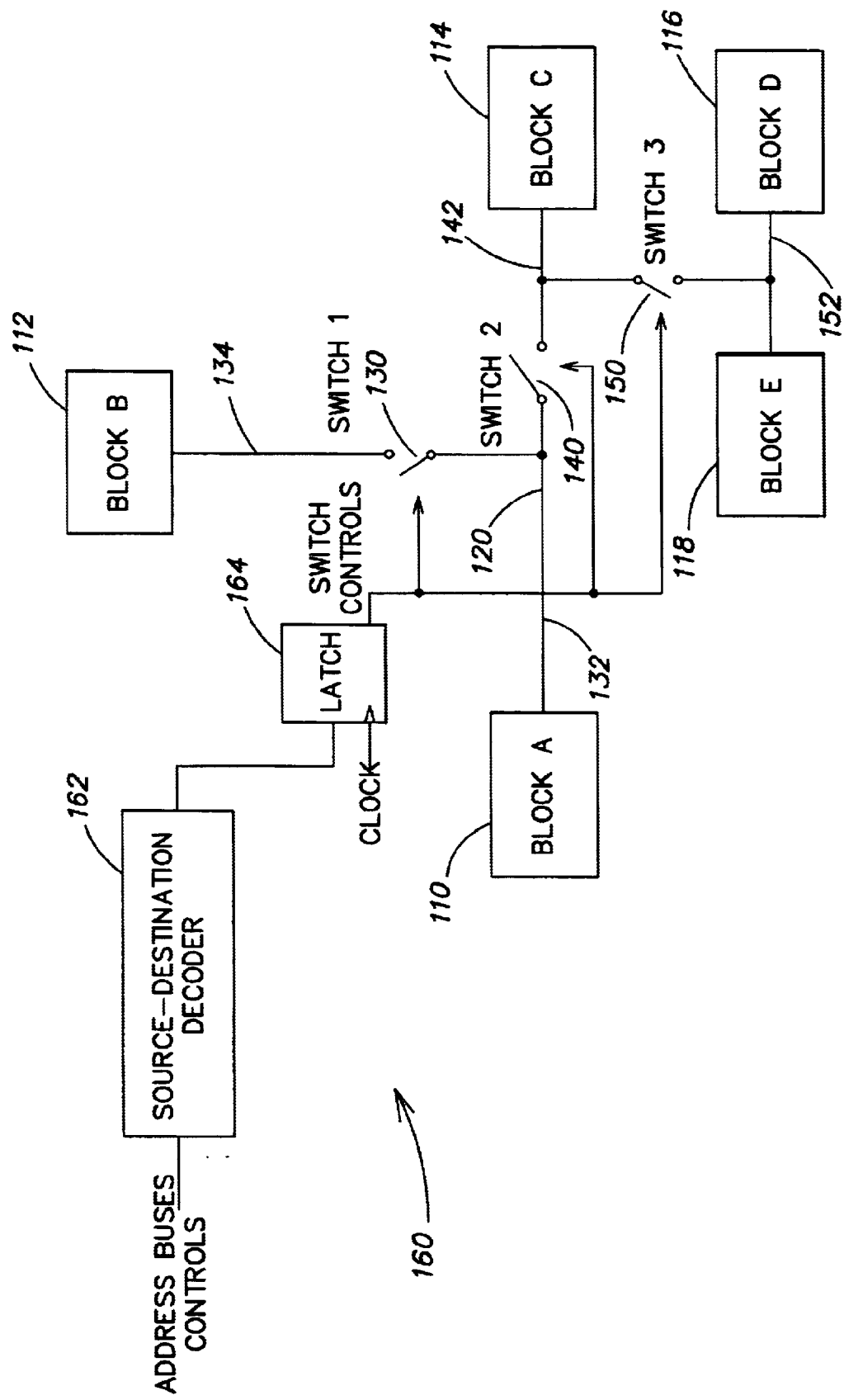
FIG. 2 is a block diagram of an embodiment of the present invention.

An electronically controllable switch 130 partitions bus 120 into a bus segment 132 and a bus segment 134. An electronically controllable switch 140 partitions bus 120 into bus segment 132 and a bus segment 142. An electronically controllable switch 150 partitions bus 120 into bus segment 142 and a bus segment 152. Each of the switches 130, 140 and 150 includes a switch element for switching each conductor of bus 120. Thus, for example, where bus 120 has 128 conductors, each of switches 130, 140 and 150 has 128 switch elements. A switch controller 160 controls the states of switches 130, 140 and 150 in response to control information as described below. In the example of FIG. 2, switch controller 160 includes a source-destination decoder 162 and a latch 164. Switch controller 160 may receive address and control information, and provides switch control signals to switches 130, 140 and 150.

The system of FIG. 2 is based on the fact that most bus transactions in a typical electronic circuit involve a single source and a single destination. A bus transaction is defined as the sending of information from one functional block to one or more other functional blocks connected to the bus. For example, with reference to FIG. 1, memory bank 40 may send an instruction or an operand to computation block 12 in response to an address on address bus 50. Only those of switches 130, 140 and 150 needed to perform the bus transaction are closed, and the remaining switches, if any, are left open. As a result, bus segments required for performing the bus transaction are interconnected, and the remaining bus segments are electrically isolated from the interconnected bus segments. This reduces power consumption and capacitance. For example, assume that a bus transaction involves transfer of data from functional block 110 to functional block 112. In this case, the switch elements of switch 130 are closed, thereby interconnecting bus segments 132 and 134, and the switch elements of switch 140 are opened, thereby electrically isolating bus segments 142 and 152 from bus segments 132 and 134. Accordingly, the bus transaction is performed on bus segments 132 and 134, and the capacitance of bus segments 142 and 152 is removed from the bus for this transaction, thereby reducing the power dissipation associated with the bus transaction. In this description, switches are "closed" when they are in the conducting state and are "open" when they are in the non-conducting state.

It will be understood that different bus transactions may involve different functional blocks and therefore may require different switch states. For example, a bus transaction between functional block 110 and functional block 114 requires that switch 140 be closed and that switches 130 and 150 be open. A transaction between functional block 114 and functional block 116 requires that switch 150 be closed and that switch 140 be open. A transaction between functional block 112 and functional block 116 requires switches 130, 140 and 150 all to be closed. For a transaction between block 116 and block 118, switch 150 may be open. In this case, the bus transaction is performed between two blocks (blocks 116 and 118) on a single bus segment (segment 152), and the remainder of bus 120 is isolated from bus segment 152.

Some bus transactions may involve more than one destination. In that case, the appropriate switches are closed to interconnect the source functional block to the destination functional blocks, and any unneeded bus segments are isolated by opening the appropriate switches. For example, where functional block 110 is the source and functional blocks 112 and 114 are the destinations, switches 130 and 140 are closed, and switch 150 is opened.

The switch controller 160 controls the states of each of the switches 130, 140 and 150. In the example of FIG. 2, source-destination decoder 162 receives the address bus and control signals which indicate the source and the destination of each bus transaction. Source and destination information is present in the electronic circuit in order to control each bus transaction, even in the absence of bus partitioning. For example, control signals may identify the bus master (source), and address signals may identify the destination. From the source and destination information, the source-destination decoder determines the appropriate switch states, such as by reference to a table. For each source-destination pair, the table may contain the required states of switches 130, 140 and 150. Examples of switch states for different source-destination pairs are given above. Latch 164 receives the system clock and is used to synchronize the switch states with the respective bus transactions. Latch 164 includes a latch element corresponding to each switch, with each latch element controlling the state of the corresponding switch. The output of latch 164, shown schematically as a single line in FIG. 2, provides signals for controlling switches 130, 140 and 150 as described below.

A sequence of bus transactions may involve different source-destination pairs. The switch controller 160 controls the states of the switches 130, 140, 150 dynamically during the sequence of bus transactions to ensure proper interconnection of bus segments to enable the bus transactions to be performed. Thus, the switch controller 160 dynamically changes the states of the switches between bus transactions. Latch 164 ensures that the switch states are stabilized when each bus transaction is performed.

Figure 3:
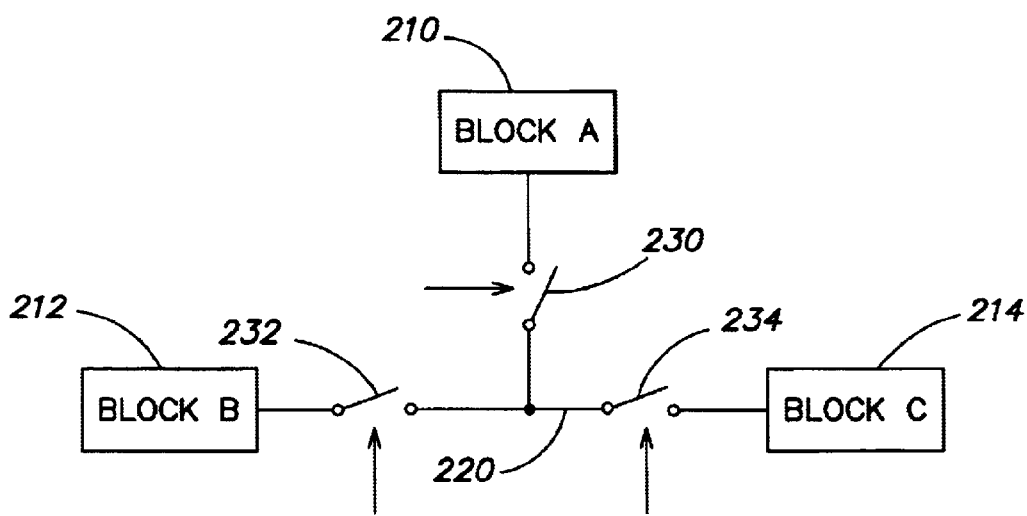
FIGS. 3–6 are block diagrams that illustrate different embodiments of the invention in an example of electronic apparatus having three functional electronic blocks.
Figure 4:
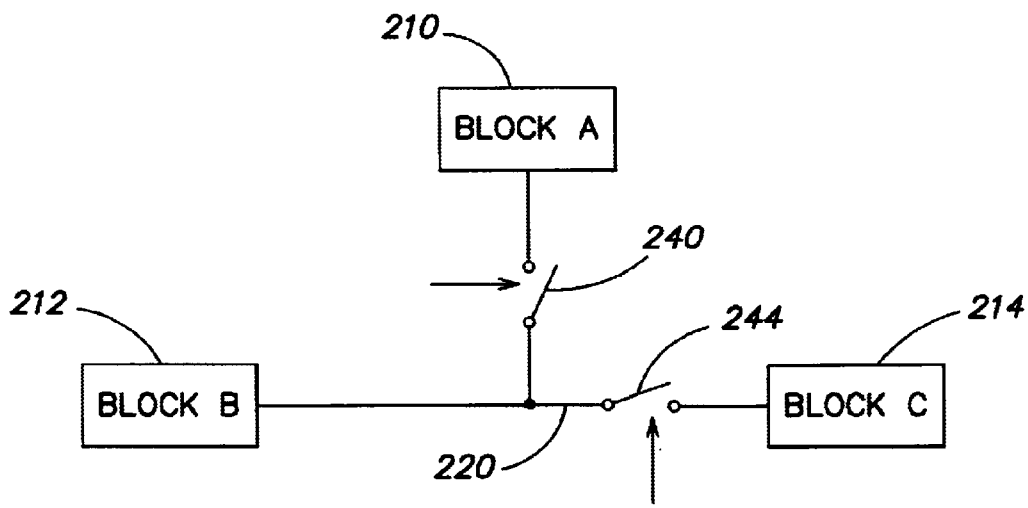
Figure 5:
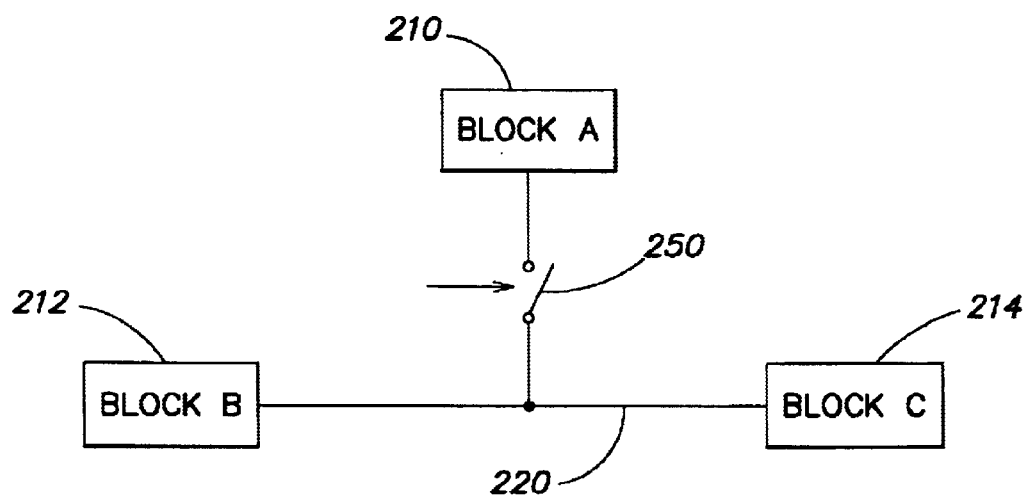
Figure 6:
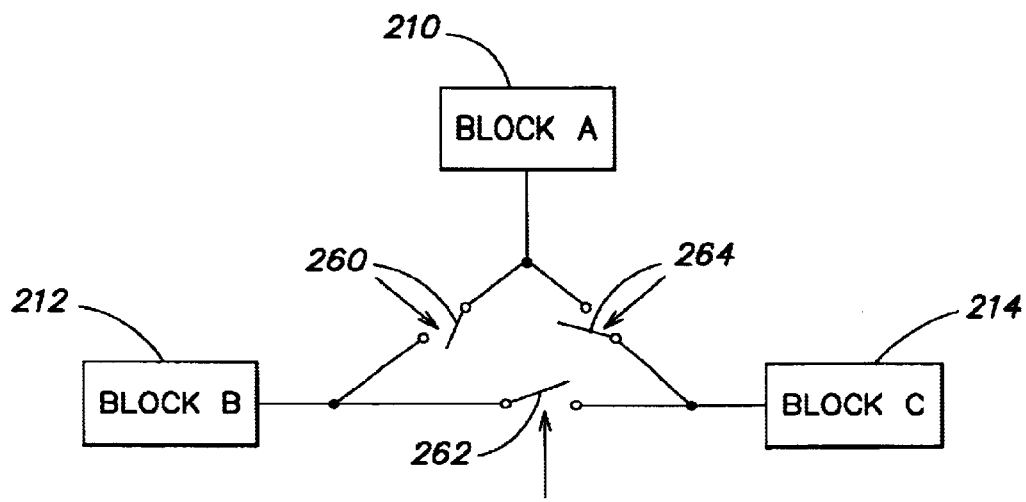

A wide variety of switch configurations may be utilized for partitioning buses within the scope of the invention. The switch configuration depends on the bus topology, the bus length and the added circuitry needed for bus partitioning. Examples of different switch configurations for an electronic apparatus having three functional blocks are shown in FIGS. 3–6. Like elements in FIGS. 3–6 have the same reference numerals. In FIGS. 3–6, functional electronic blocks 210, 212 and 214 are interconnected by a bus 220. In the example of FIG. 3, switches 230, 232 and 234 are placed in bus segments connected to functional blocks 210, 212 and 214, respectively. In this configuration, at least two switches must be closed in order to perform a bus transaction. In FIG. 4, switches 240 and 244 are placed in the bus segments connected to functional blocks 210 and 214, respectively. The switches 240 and 244 can be positioned in any two of the bus segments. In FIG. 5, a single switch 250 is placed in the bus segment connected to functional block 210. This configuration may be desirable, for example, where the bus segment connected to functional block 210 is longer than the other bus segments. The single switch 250 may be positioned in any of the bus segments as desired. FIG. 6 illustrates a switch configuration where a switch 260 is placed between functional blocks 210 and 212; a switch 262 is placed between functional blocks 212 and 214; and a switch 264 is placed between functional blocks 210 and 214. In the configuration of FIG. 6, any two functional blocks may be interconnected by closing a single switch. FIGS. 3–6 illustrate the fact that many switch configurations may be utilized for partitioning a bus, even where the bus is connected to only three functional blocks.

Bus partitioning depends on a number of factors, including bus length and bus geometry. The optimal partitioning from a speed standpoint is to partition the bus into equal bus segments, assuming that wire capacitance dominates gate capacitance. The RC delay of the wire increases quadratically with the wire length. As the bus is partitioned into more segments, the wire delay goes down, while the driver delay goes up, because some delay is added by each gate, or switch element, that is placed in the datapath. In general, more partitions are needed for longer buses. Furthermore, the partitioning should be done in such a way that, if possible, the functional blocks that communicate most frequently with each other are located on the same bus segment. This permits a larger percentage of the capacitance to be isolated from the bus more frequently. A given bus may be partitioned into 2 to n segments, and the segments may be interconnected by 1 to m electronically controllable switches. A particular bus transaction may require 1 to n segments and may require that 0 to m switches be closed.

Figure 7:
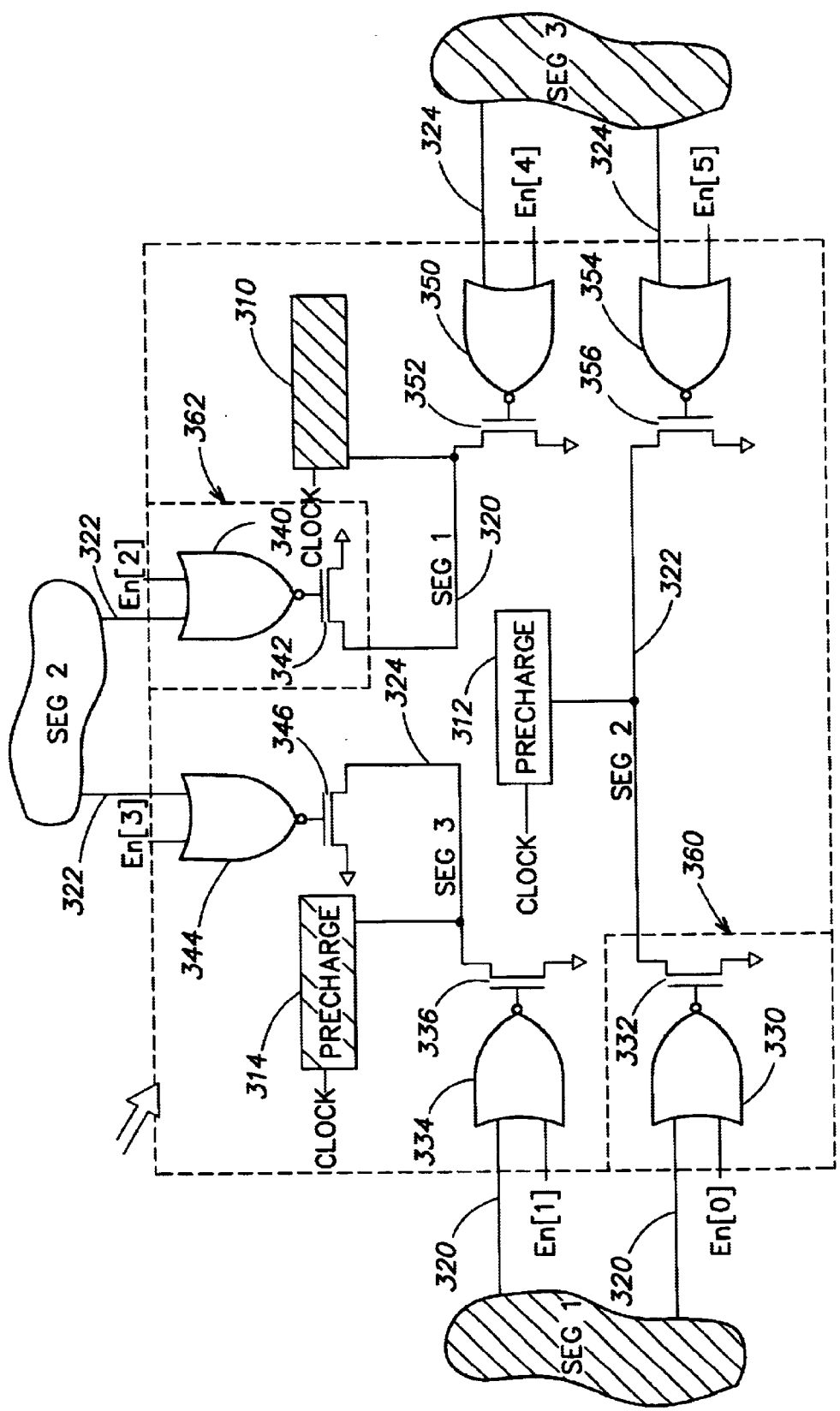
FIG. 7 is a block diagram of a first example of an implementation of an electronically controllable switch for partitioning a bus into bus segments.

An example of an implementation of a dynamic electronically controllable switch for bus partitioning is shown in FIG. 7. Circuitry for a single bus conductor is shown in FIG. 7. It will be understood that the circuitry is repeated for each bus conductor. Dynamic logic is logic that has a precharge phase and an evaluation phase, both controlled by a clock. During the precharge phase, the output of a gate is precharged to logic state "1", and during the evaluation phase that follows, the output can be pulled down to logic state "0" by turning on a transistor or kept at logic state "1" if the transistor is turned off. Dynamic gates are thus cycled with precharge and evaluation phases. In FIG. 7, all enable signals are derived from clocks, meaning that each NOR gate is turned off during the precharge phase and is selectively turned on (depending on the source/destination address) during the evaluation phase.

Precharge circuits 310, 312 and 314 receive the system clock and are connected to bus segment 1 conductor 320, bus segment 2 conductor 322 and bus segment 3 conductor 324, respectively. A NOR gate 330 and an FET 332 are connected between segment 1 conductor 320 and segment 2 conductor 322. NOR gate 330 receives an enable signal En(0) from switch controller 160 (FIG. 2). A NOR gate 334 and an FET 336 are connected between segment 1 conductor 320 and segment 3 conductor 324. NOR gate 334 receives an enable signal En(1) from switch controller 160. A NOR gate 340 and an FET 342 are connected between segment 2 conductor 322 and segment 1 conductor 320. NOR gate 340 receives an enable signal En(2) from switch controller 160. A NOR gate 344 and an FET 346 are connected between segment 2 conductor 322 and segment 3 conductor 324.

NOR gate 344 receives an enable signal En(3) from switch controller 160. A NOR gate 350 and an FET 352 are connected between segment 3 conductor 324 and segment 1 conductor 320. NOR gate 350 receives an enable signal En(4) from switch controller 160. A NOR gate 354 and an FET 356 are connected between segment 3 conductor 324 and segment 2 conductor 322. NOR gate 354 receives an enable signal En(5) from switch controller 160. Each NOR gate and associated FET constitute a unidirectional switch element, and each enable signal constitutes a switch control signal. Thus, NOR gate 330 and FET 332 constitute a unidirectional switch element 360, and NOR gate 340 and FET 342 constitute a unidirectional switch element 362.

The switch embodiment of FIG. 7 provides a directional connection between bus segment conductors. Thus, for example, switch element 360 provides a connection in one direction from segment 1 conductor 320 to segment 2 conductor 322; and switch element 362 provides a connection in the reverse direction from segment 2 conductor 322 to segment 1 conductor 320. Thus, switch elements 360 and 362 constitute a bi-directional switch element of an electronically controllable switch for partitioning bus segments 1 and 2.

Figure 8:
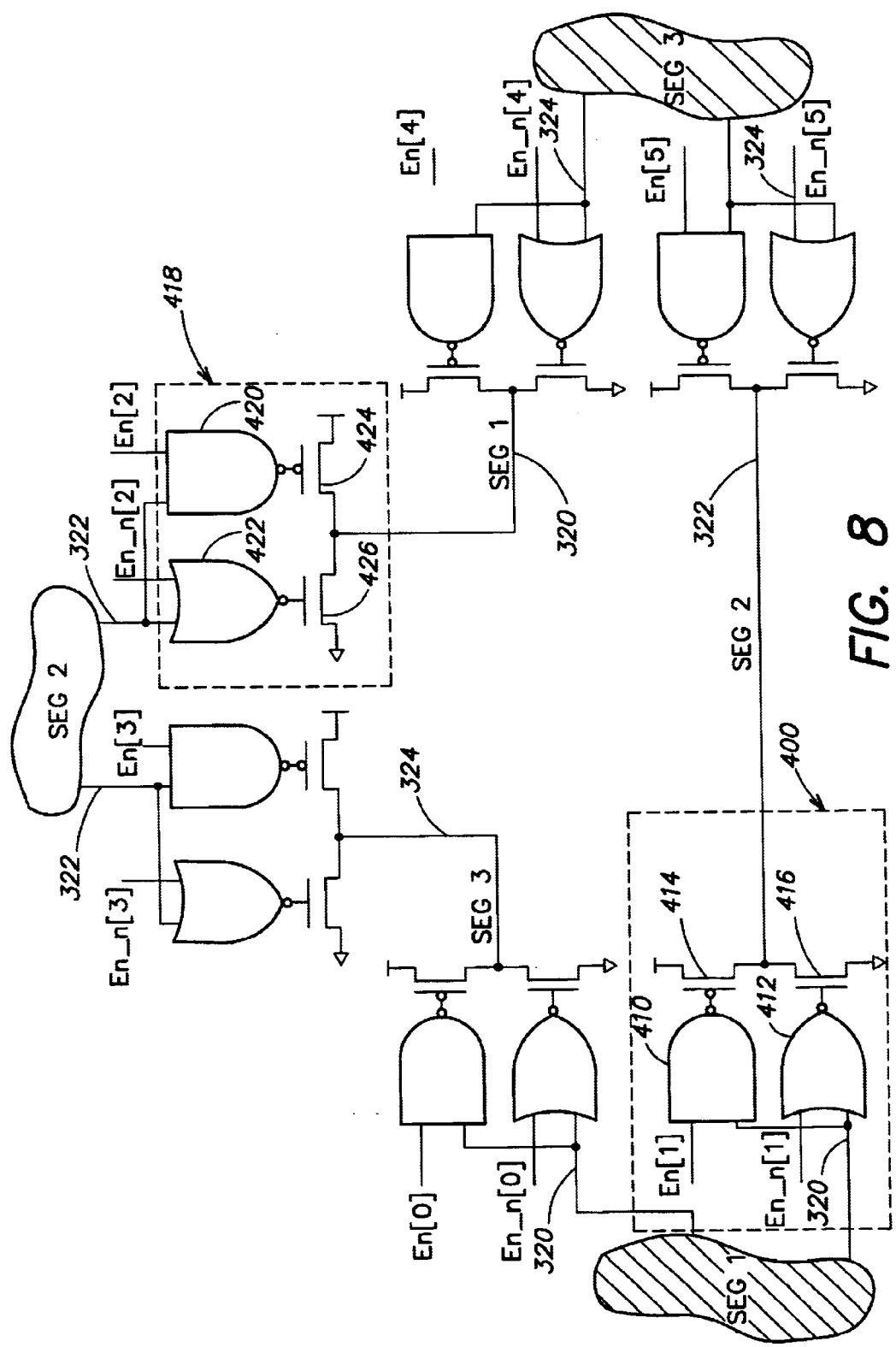
FIG. 8 is a block diagram of a second example of an implementation of an electronically controllable switch for partitioning a bus into bus segments.

An example of an implementation of a static electronically controllable switch for bus partitioning is shown in FIG. 8. Like elements in FIGS. 7 and 8 have the same reference numerals. In distinction to the dynamic logic described above, static logic is not dependent on a clock for proper evaluation. A unidirectional switch element 400, connected between segment 1 conductor 320 and segment 2 conductor 322, includes a NAND gate 410, a NOR gate 412 and FETs 414 and 416. NAND gate 410 receives the bus signal on segment 1 conductor 320 and an enable signal En(1). The output of NAND gate 410 is connected to the gate of FET 414. NOR gate 412 receives the bus signal on segment 1 conductor 320 and an inverted enable signal En__n(1). The output of NOR gate 412 is connected to the gate of FET 416. FETs 414 and 416 are connected in series between the supply voltage and ground. The node connecting FETs 414 and 416 is connected to segment 2 conductor 322. A unidirectional switch element 418, including NAND gate 420, NOR gate 422 and FETs 424 and 426, is used for connecting segment 2 conductor 322 to segment 1 conductor 320. Unidirectional switch elements 400 and 418 constitute a bidirectional switch element of an electronically controllable switch for partitioning bus segments 1 and 2. This circuit is replicated for each switch element of each switch.

The implementations of the electronically controllable switches shown in FIGS. 7 and 8 and described above involve the addition to the bus of buffers, such as NOR gate 330 and FET 332 in FIG. 7. It may be demonstrated that the buffers make the bus operate faster than if there were no buffers at all.

Figure 9:
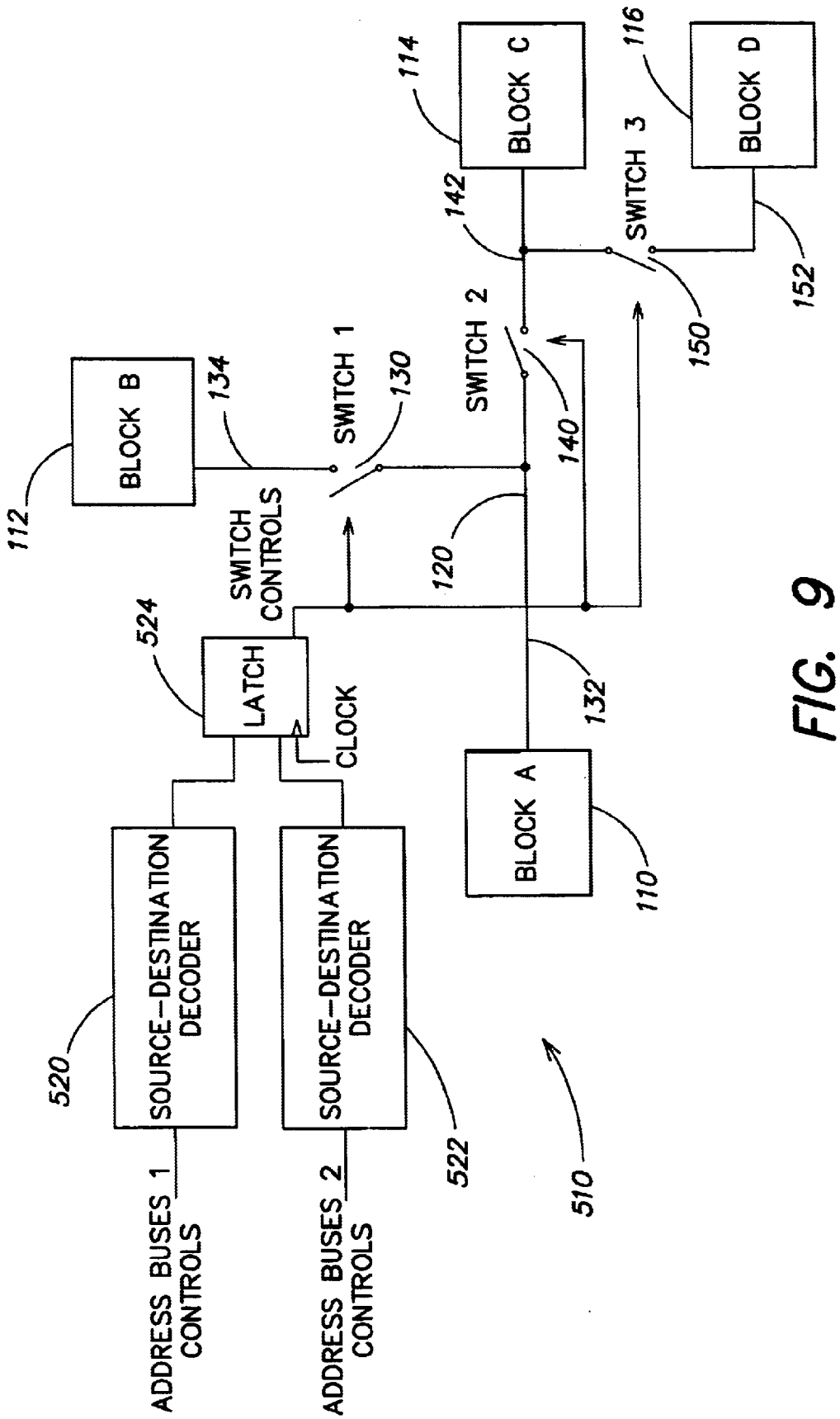
FIG. 9 is a block diagram of an embodiment of the invention wherein two bus transactions may be performed on different groups of bus segments simultaneously.

Another embodiment of the invention is described with reference to FIG. 9. Like elements in FIGS. 2 and 9 have the same reference numerals. An electronic circuit shown in FIG. 9 employs the same basic circuit topology as the electronic circuit of FIG. 2, including functional blocks 110, 112, 114 and 116, and switches 130, 140 and 150 for partitioning bus 120. A switch controller 510 includes a first source-destination decoder 520, a second source-destination decoder 522 and a latch 524. Latch 524 includes a latch element corresponding to each switch, with each latch element controlling the state of the corresponding switch. The configuration of FIG. 9 permits two bus transactions to be performed on bus 120 simultaneously. For example, functional block 110 may be the source of a first bus transaction and functional block 112 may be the destination of the first bus transaction, thus requiring switch 130 to be closed. Functional block 114 may be the source of a second bus transaction and functional block 116 may be the destination of the second bus transaction, thus requiring switch 150 to be closed. In this case, switch 140 is open. The first bus transaction is performed on a first bus section including bus segments 132 and 134, and the second bus transaction is performed on a second bus section including bus segments 142 and 152. Switch 140 electrically isolates the bus sections such that the first and second bus transactions can be performed simultaneously.

The ability to perform simultaneous bus transactions depends on the bus configuration and on the transactions to be performed. In many instances, two bus transactions cannot be performed simultaneously, because the same bus segment is required for both bus transactions. However, when bus transactions can be performed simultaneously, higher throughput is achieved, and the power dissipation associated with each bus transaction is reduced. Because of the large width of buses in terms of numbers of bits, it may not be possible to simply make the bus conductors wider, as this would cause the chip area to grow. Thus, where on-chip bus throughput is a bottleneck, the ability to perform simultaneous bus transactions may provide a significant saving.

Source-destination decoder 520 receives address information representative of the source and the destination of the first bus transaction and determines the required switch states for performing the first bus transaction. Source-destination decoder 522 receives address information representative of the source and the destination of the second bus transaction and determines the required switch states for performing the second bus transaction. The outputs of source-destination decoders 520 and 522 are supplied to latch 524, which provides signals for controlling the states of switches 130, 140 and 150. In the example described above, switch 130 is closed to enable the first bus transaction between functional block 110 and functional block 112; switch 150 is closed to enable the second bus transaction between functional block 114 and functional block 116; and switch 140 is open to electrically isolate the two bus transactions. It will be understood that the present invention is not limited to two simultaneous bus transactions. Two or more bus transactions can be performed simultaneously, if permitted by the bus partitioning topology and the required transactions. This feature may be particularly advantageous in the case of repetitive bus transactions, such as DMA transfers. For example, with reference to FIG. 1, the DMA units 76 and 78 may communicate most of the time with external port 28, while computation blocks 12 and 14 communicate most of the time with memory banks 40, 42 and 44. Thus, the two transaction types have different sources and destinations.

The invention has been described in connection with digital signal processors. However, the invention may be utilized with any processing unit or electronic circuit where reduction of bus power dissipation may be advantageous. The invention is considered to be most practical for use with on-chip buses, but is not limited to this application.

While there have been shown and described what are at present considered the preferred embodiments of the present invention, it will be obvious to those skilled in the art that various changes and modifications may be made therein without departing from the scope of the invention as defined by the appended claims.

What is claimed:

1. Electronic apparatus comprising:
   a plurality of functional electronic blocks on a single monolithic integrated circuit;
   an on-chip bus interconnecting said functional blocks;
   one or more on-chip electronically controllable switches partitioning said bus into bus segments, each of said electronically controllable switches having an on state wherein two of said bus segments are interconnected and an off state wherein said two bus segments are isolated, each of said electronically controllable switches comprising a dynamic logic bidirectional bus buffer; and
   an on-chip switch controller for controlling the states of said electronically controllable switches in response to control information, wherein said functional blocks, said bus, said electronically controllable switches and said switch controller are fabricated on a single substrate.

2. Electronic apparatus as defined in claim 1, wherein said functional blocks are components of a digital signal processor.

3. Electronic apparatus as defined in claim 1, wherein said functional blocks comprise a computation block, a memory block and a control block.

4. Electronic apparatus as defined in claim 1, wherein said bus comprises multiple conductors and wherein each of said electronically controllable switches partitions each conductor of said bus.

5. Electronic apparatus as defined in claim 1, wherein said switch controller comprises a source-destination decoder for controlling the electronically controllable switches in response to control information representative of the source and the destination of each bus transaction.

6. Electronic apparatus as defined in claim 1, wherein said switch controller comprises means for dynamically changing the states of said electronically controllable switches between transactions of a sequence of bus transactions, in response to control information representative of the source and the destination of each of the bus transactions.

7. Electronic apparatus as defined in claim 1, wherein said switch controller comprises means responsive to control information representative of the source and the destination of each bus transaction for controlling the states of said electronically controllable switches.

8. Electronic apparatus as defined in claim 1, wherein said switch controller comprises means for controlling the states of said electronically controllable switches to permit two or more simultaneous bus transactions on said bus.

9. Electronic apparatus comprising:
   a plurality of functional electronic blocks;
   a bus interconnecting said functional blocks;
   one or more electronically controllable switches partitioning said bus into bus segments, each of said electronically controllable switches having an on state wherein two of said bus segments are interconnected and an off state wherein said two bus segments are isolated; and
   a switch controller for controlling the states of said electronically controllable switches in response to control information, wherein said switch controller comprises first and second source-destination decoders, each responsive to control information representative of the source and the destination of a different bus transaction, for controlling the states of said electronically controllable switches to permit first and second simultaneous bus transactions on said bus.

10. Electronic apparatus as defined in claim 1, wherein each dynamic logic bidirectional bus buffer comprises, in each bus direction, a dynamic logic NOR gate and a field effect transistor.

11. In electronic apparatus comprising a plurality of functional electronic blocks interconnected by a bus, a method for communicating between the functional blocks, comprising the steps of:
    fabricating a plurality of functional electronic blocks on a single monolithic integrated circuit;
    interconnecting the functional electronic blocks with an on-chip bus;
    partitioning the on-chip bus into bus segments using electronically controllable dynamic logic bidirectional bus buffers;
    enabling a bus transaction between a source functional block and a destination functional block by interconnecting bus segments to complete a connection between the source and destination functional blocks; and
    performing the bus transaction on the interconnected bus segments.

12. A method as defined in claim 11, wherein the step of partitioning the bus comprises partitioning the bus with one or more electronically controllable switches and wherein the step of enabling a bus transaction comprises controlling the states of the electronically controllable switches in response to control information representative of the source and the destination of the bus transaction.

13. A method as defined in claim 11, wherein the step of partitioning the bus comprises partitioning the bus with one or more electronically controllable switches and wherein the step of enabling a bus transaction comprises dynamically changing the states of said electronically controllable switches between transactions of a sequence of bus transactions, in response to control information representative of the source and the destination of each of the bus transactions.

14. A method as defined in claim 11, wherein the step of partitioning the bus comprises partitioning the bus with one or more electronically controllable switches and wherein the step of enabling a bus transaction comprises controlling the states of said electronically controllable switches to permit two or more simultaneous bus transactions on said bus.

15. A method as defined in claim 11, wherein the step of enabling a bus transaction further comprises the step of electrically isolating bus segments that are not needed for the bus transaction.

16. A method as defined in claim 11, wherein each of the electronically controllable dynamic logic bidirectional bus buffers comprises, in each bus direction, a dynamic logic NOR gate and a field effect transistor.

17. Electronic apparatus comprising:
    a plurality of functional electronic blocks on a single monolithic integrated circuit;
    an on-chip bus interconnecting said functional electronic blocks, wherein said functional electronic blocks and said bus are fabricated on a single substrate;
    means for partitioning the on-chip bus into bus segments, comprising electronically controllable dynamic logic bidirectional bus buffers; and
    means for enabling a bus transaction on the bus by interconnecting bus segments in response to control information representative of the source and the destination of the bus transaction.

18. Electronic apparatus as defined in claim 17, wherein said functional blocks are components of a digital signal processor.

19. Electronic apparatus as defined in claim 17, wherein said functional blocks comprise a computation block, a memory block and a control block.

20. Electronic apparatus as defined in claim 17, wherein said means for partitioning the bus comprises one or more electronically controllable switches, each having an on state and an off state, and wherein said means for enabling a bus transaction comprises a switch controller for controlling the states of said electronically controllable switches in response to said control information.

21. Electronic apparatus as defined in claim 20, wherein said switch controller comprises a source-destination decoder for controlling the electronically controllable switches in response to said control information.

22. Electronic apparatus as defined in claim 20, wherein said switch controller comprises means for dynamically changing the states of said electronically controllable switches between transactions of a sequence of bus transactions, in response to control information representative of the source and the destination of each of the bus transactions.

23. Electronic apparatus as defined in claim 20, wherein said switch controller comprises means for controlling the states of said electronically controllable switches to permit two or more simultaneous bus transactions on said bus.

24. Electronic apparatus comprising:

a plurality of functional electronic blocks interconnected by a bus;

means for partitioning the bus into bus segments; and means for enabling a bus transaction on the bus by interconnecting bus segments in response to control information representative of the source and the destination of the bus transaction;

wherein said means for partitioning the bus comprises one or more electronically controllable switches, each having an on state and an off state, wherein said means for enabling a bus transaction comprises a switch controller for controlling the states of said electronically controllable switches in response to said control information, and wherein said switch controller comprises first and second source-destination decoders, each responsive to control information representative of the source and the destination of a different bus transaction, for controlling the states of said electronically controllable switches to permit first and second simultaneous bus transactions on said bus.

25. Electronic apparatus as defined in claim 17, wherein each of the electronically controllable dynamic logic bidirectional bus buffers comprises, in each bus direction, a dynamic logic NOR gate and a field effect transistor.

* * * * *